(12) United States Patent
Schwindt et al.

(10) Patent No.: US 12,081,566 B2
(45) Date of Patent: Sep. 3, 2024

(54) AIRCRAFT NETWORK MONITORING AND ATTESTATION

(71) Applicant: GE Aviation Systems Limited, Cheltenham (GB)

(72) Inventors: Stefan Alexander Schwindt, Cheltenham (GB); Mustafa Hussain, Munich (DE)

(73) Assignee: GE Aviation Systems Limited, Cheltenham (GB)

( * ) Notice: Subject to any disclaimer, the term of this patent is extended or adjusted under 35 U.S.C. 154(b) by 236 days.

(21) Appl. No.: 16/984,226

(22) Filed: Aug. 4, 2020

(65) Prior Publication Data

US 2022/0046037 A1 Feb. 10, 2022

(51) Int. Cl.

| | |
|---|---|
| *H04L 9/40* | (2022.01) |
| *B64D 43/00* | (2006.01) |
| *B64F 5/60* | (2017.01) |
| *G06F 21/60* | (2013.01) |
| *H04L 12/40* | (2006.01) |
| *H04L 41/06* | (2022.01) |
| *H04L 41/0681* | (2022.01) |
| *H04L 41/0686* | (2022.01) |
| *H04L 41/0853* | (2022.01) |
| *H04L 43/067* | (2022.01) |
| *H04L 43/16* | (2022.01) |

(52) U.S. Cl.
CPC .......... *H04L 63/1425* (2013.01); *B64D 43/00* (2013.01); *B64F 5/60* (2017.01); *G06F 21/602* (2013.01); *H04L 12/40* (2013.01); *H04L 41/06* (2013.01); *H04L 41/0681* (2013.01); *H04L 41/0686* (2013.01); *H04L 41/0853* (2013.01); *H04L 43/067* (2013.01); *H04L 43/16* (2013.01); *H04L 63/1416* (2013.01); *H04L 2012/4028* (2013.01)

(58) Field of Classification Search
CPC . H04L 63/1425; H04L 63/1416; H04L 41/06; H04L 41/0681; H04L 41/0686; H04L 41/0853; H04L 43/067; H04L 43/16; H04L 12/40; H04L 21/062; H04L 2012/4028; B64D 43/00; B64F 5/16; B64F 5/60; G06F 21/602
USPC ................... 726/23; 709/217–219, 223–224
See application file for complete search history.

(56) References Cited

U.S. PATENT DOCUMENTS

| | | |
|---|---|---|
| 5,794,224 A | 8/1998 | Yufik |
| 8,982,784 B2 | 3/2015 | Müller et al. |
| 9,233,763 B1 | 1/2016 | Chen |
| 9,346,562 B2 | 5/2016 | Wolfe |
| 9,900,082 B1 | 2/2018 | Chowdhury et al. |

(Continued)

FOREIGN PATENT DOCUMENTS

| | | | | |
|---|---|---|---|---|
| CN | 107690680 A | | 2/2018 | |
| EP | 2 827 209 B1 | * | 1/2022 | ......... G05B 23/0251 |

*Primary Examiner* — Bryan Y Lee
(74) *Attorney, Agent, or Firm* — McGarry Bair PC

(57) ABSTRACT

A system and method for compiling and monitoring a list of operational aircraft components to determine if a threshold is met. Utilizing the list and the threshold can provide for monitoring the network of aircraft components to monitor both health and security of the aircraft network and components thereof. The system can then indicate or alert when a threshold is met or exceeded. Such an alert can be on a display to a pilot, for example, or to a remote monitoring station.

19 Claims, 2 Drawing Sheets

(56) References Cited

U.S. PATENT DOCUMENTS

| | | | |
|---|---|---|---|
| 9,926,086 B2 | 3/2018 | Kumar et al. | |
| 9,938,019 B2 | 4/2018 | Floyd et al. | |
| 10,220,955 B2 | 3/2019 | Gregory et al. | |
| 11,577,859 B1* | 2/2023 | Howard | G06N 3/006 |
| 2011/0313614 A1 | 12/2011 | Hinnant, Jr. | |
| 2013/0197739 A1 | 8/2013 | Gallagher et al. | |
| 2015/0187148 A1* | 7/2015 | Sannino | G07C 5/0841 |
| | | | 701/29.2 |
| 2016/0057160 A1* | 2/2016 | Buehler | H04L 63/20 |
| | | | 726/23 |
| 2017/0054740 A1 | 2/2017 | Mitchell | |
| 2017/0320590 A1* | 11/2017 | Tucker | B64D 45/00 |
| 2017/0331844 A1* | 11/2017 | Harrigan | B64F 5/60 |
| 2019/0013997 A1* | 1/2019 | Schwindt | H04L 41/06 |
| 2019/0156596 A1 | 5/2019 | Followell et al. | |
| 2020/0167472 A1* | 5/2020 | Hertenstein | H04L 9/3236 |
| 2020/0198806 A1* | 6/2020 | Wirth | B64F 5/60 |

* cited by examiner

AIRCRAFT NETWORK MONITORING AND ATTESTATION

TECHNICAL FIELD

The disclosure relates to a method and apparatus for monitoring and attestation for the health and securing of networked aircraft avionics and components.

BACKGROUND OF THE INVENTION

Aircraft are commonly equipped with a system of avionics and electronic systems, as well as a network interconnecting many or all the avionics and electronics systems. However, traditional network security measures are not readily applicable to an aircraft or avionics environment. Furthermore, there is a trend to bundling sensor and other measurement data onto large databuses, which increases the chance of equipment or software faults from common mode failures that impact a wide range of aircraft functions, outside of the initial failure. Thus, there is a need for creative means to secure and monitor aircraft networks, or utilize network security means that are tailored to an aviation implementation.

BRIEF DESCRIPTION

Aspects and advantages of the invention will be set forth in part in the following description, or may be obvious from the description, or may be learned through practice of the invention.

In one aspect, the present disclosure relates to a method of monitoring the health and security of networked avionics on an aircraft, the method comprising: generating a list including executables and libraries representative of the networked avionics; monitoring the list; alerting when one or more of the networked avionics provided on the list meets a predetermined threshold.

In another aspect, the present disclosure relates to a network system for an aircraft comprising: a set of aircraft devices; a network communicatively and electronically interconnecting the set of aircraft devices; a configuration management unit electronically communicable with the network and configured to detect or measure the set of aircraft devices across the network, wherein the configuration management unit is configured to generate a list representing a configuration of the network and the set of aircraft devices; wherein the list includes executables or libraries associated with the set of aircraft devices and the network; and wherein the configuration management unit is configured to monitor the list to determine if the configuration is no longer approved by the configuration management unit.

In yet another aspect, the present disclosure relates to a method of monitoring network security in an aircraft, the method comprising: generating a list representative of an aircraft network and one or more aircraft components on the aircraft network; periodically monitoring the list; and indicating, on a display, which functionalities of the aircraft could be impacted or are impacted when the one or more aircraft components monitored on the list reaches a predetermined threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DETAILED DESCRIPTION

Figure 1:
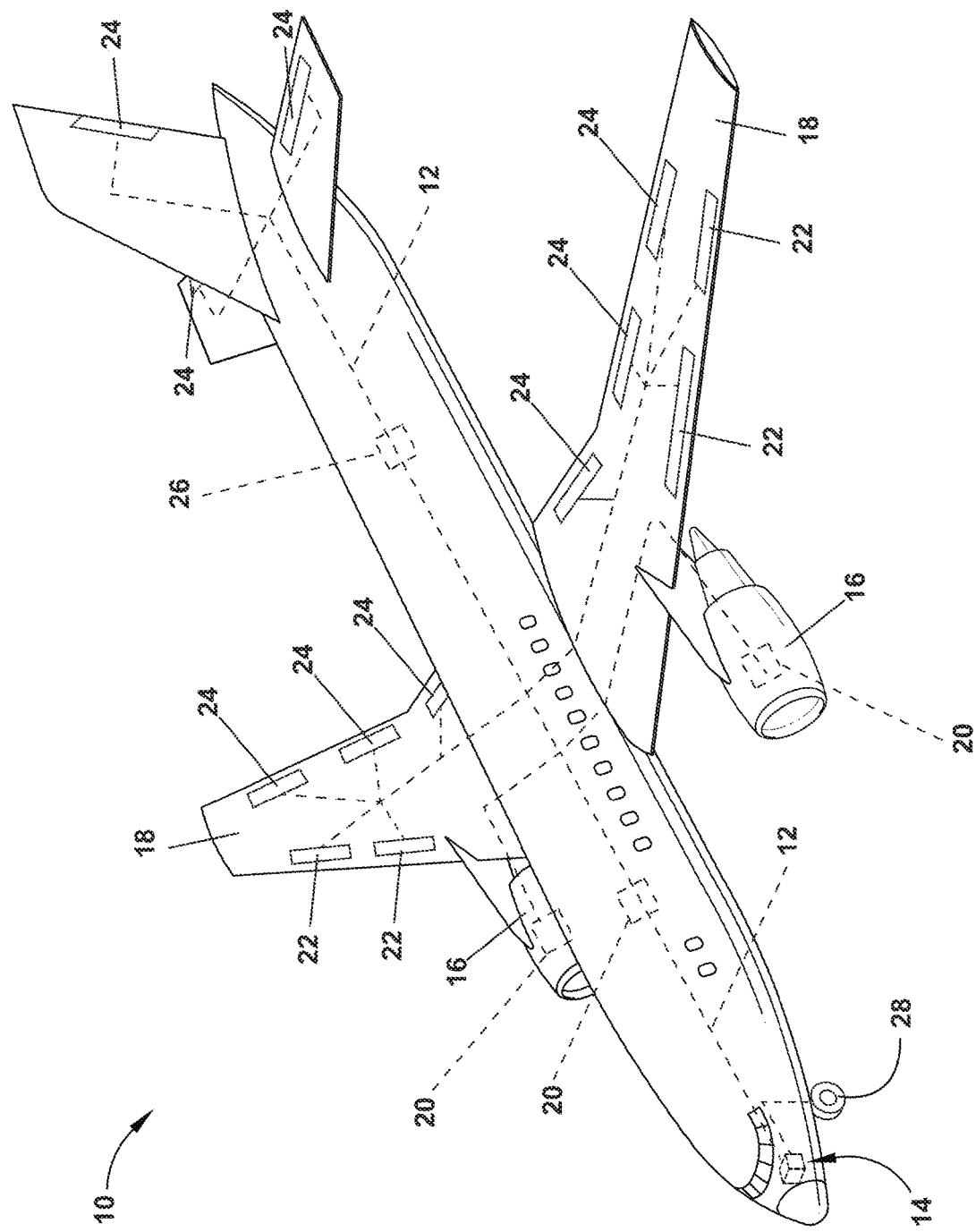
FIG. 1 is a schematic view of an exemplary aircraft and network system therefor, in accordance with various aspects described herein.

Aspects of the disclosure relate to a system and method for monitoring the health and security of networked aircraft avionics or other components. Aspects of the disclosure also relate to monitoring and attestation for the health and securing of networked aircraft avionics and components. While the disclosure provided herein is described in reference to an aircraft including an avionics chassis and related networking, it should be appreciated that alternative implementations on alternative aircraft are contemplated, including those that do or do not include avionics chassis or boxes, or those including more, less, or different aircraft or network components as those described herein. While the description will generally pertain to an avionics chassis, it should be appreciated that the elements of monitoring or security need not include or route through an avionics chassis. Similarly, the system and method as described herein will also have applicability in other mobile or vehicular environments where network monitoring and health attestation are desirable, such as non-aircraft, terrestrial, or other environments, as well as any non-traditional networked systems where traditional security or monitoring means do not readily work or suffer from unique challenges, similar to that of an aircraft.

While "a set of" various elements will be described, it will be understood that "a set" can include any number of the respective elements, including only one element. The use of the terms "proximal" or "proximally" refers to moving in a direction toward another component, or a component being relatively closer to the other as compared to another reference point. Also, as used herein, while sensors can be described as "sensing" or "measuring" a respective value, sensing or measuring can include determining a value indicative of or related to the respective value, rather than directly sensing, or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interrelated when describing aspects of the electrical circuit, or circuit operations.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Additionally, connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus, or between buses.

As used herein, a "system", "controller", "avionics", "component", "configuration management unit", or a "controller module" can include at least one processor and memory, while not every component need at least one processor and memory. A controller module, configuration management unit, or other similar component, can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile, or non-transient, or non-volatile memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Additionally, as used herein, elements being "electrically connected," "electrically coupled," "communicatively coupled," or "in signal communication" can include an electric transmission or signal being sent, received, or communicated to or from such connected or coupled elements. Furthermore, such electrical connections or couplings can include a wired or wireless connection, or a combination thereof.

The disclosure can be implemented in any network or electrical control, operation, or communication system, any aircraft avionics system or network, or other aircraft electrical system. A non-limiting example of an electrical circuit environment that can include aspects of the disclosure can include an aircraft power system architecture, which enables production or supplying of electrical power from a power source (e.g. a generator or power storage unit or device), and delivers the electrical power to a set of electrical loads. Additional non-limiting elements can be included in such an architecture, such as sensors, transmitters, or transceivers in non-limiting examples.

FIG. 1 schematically illustrates an aircraft 10 including an aircraft network 12 with an avionics chassis 14, which can contain one or more of a CPU, controller, management unit, or a configuration management unit for controlling, communicating, and operating various aspects associated with the flight of the aircraft 10 or components associated with the aircraft 10. The aircraft 10 can utilize or incorporate a myriad of electrical components utilized in operating various aspects of the aircraft 10 either for flight or for non-flight operations, such as maintenance. The network 12 as shown in FIG. 1, and as generally used herein, includes a communication system contained within the aircraft 10. However, it should be appreciated that the network 12 can include additional remote features, such as a remote memory unit, or even a control tower or airport in communication with the network 12 remote from the aircraft 10.

Non-limiting examples of the aircraft electrical components can include the avionics chassis 14, turbine engines 16 (provided on each wing 18) including turbine engine components 20, flaps 22, slats 24, a transceiver 26, or landing gear 28. A non-limiting list of additional components can include sensors or other aircraft electrical components, such as buttons, displays, user interfaces, control boards, communication means such as headphones or speakers, as well as related controllers, processors, or memory units. Non-limiting examples of sensors can include temperature sensors, pressure sensors, vibration sensors, sound or noise sensors, air temperature sensors, or any other desirable sensor provided on an aircraft. Additionally, the control board provided in the cockpit of the aircraft 10 includes a plurality of electrical components associated with operation of the aircraft 10. The components of the control board can be included as a portion of the aircraft network 12. Further still, other electrical components can be included as a portion of the network, such as electrical components in the cabin of the aircraft, such as lighting, air conditioning, or passenger entertainment and connection. Further components can include devices, such as a network switch or interface device. An interface device can be a remote interface unit (RIU), for example. Additional components can include internet routers or transmitters, or other connectivity elements. Additional contemplated components include, but are not limited to, humidity sensors, noise or decibel sensors, gas sensors, pollution sensors, pressure sensors, air speed sensors, angle of attack sensors, weather radar, surveillance radar, altimeter, turbulence radar, LIDAR, and communication transmitters, such as radio or satellite.

Additionally, one or more of the elements may be provided in a turbine engine, or a component 20 thereof. More specifically, the turbine engine 16 itself can include a myriad of electrical components, such as air temperature sensors or air speed sensors, or other components related to the operation of the engines, which can be communicated to or controlled by the pilots, or someone remotely operating the aircraft 10 via the transceiver 26, for example.

The avionics chassis 14, or any component along the network 12, can be a specific configuration management unit (CMU) 30, dedicated to the operation of the monitoring or security of the network 12, or alternatively, the CMU 30 can be configured as a network switch or system thereof, or an interface unit that has functionality particularly dedicated to the monitoring and attestation of the network 12, or even individual elements thereof. Monitoring, in non-limiting examples, can include monitoring component throughput, monitoring throughput capacity, monitoring memory usage, monitoring memory capacity, monitoring temperature, monitoring pressure, monitoring latency, monitoring energy usage, etc.

Figure 2:
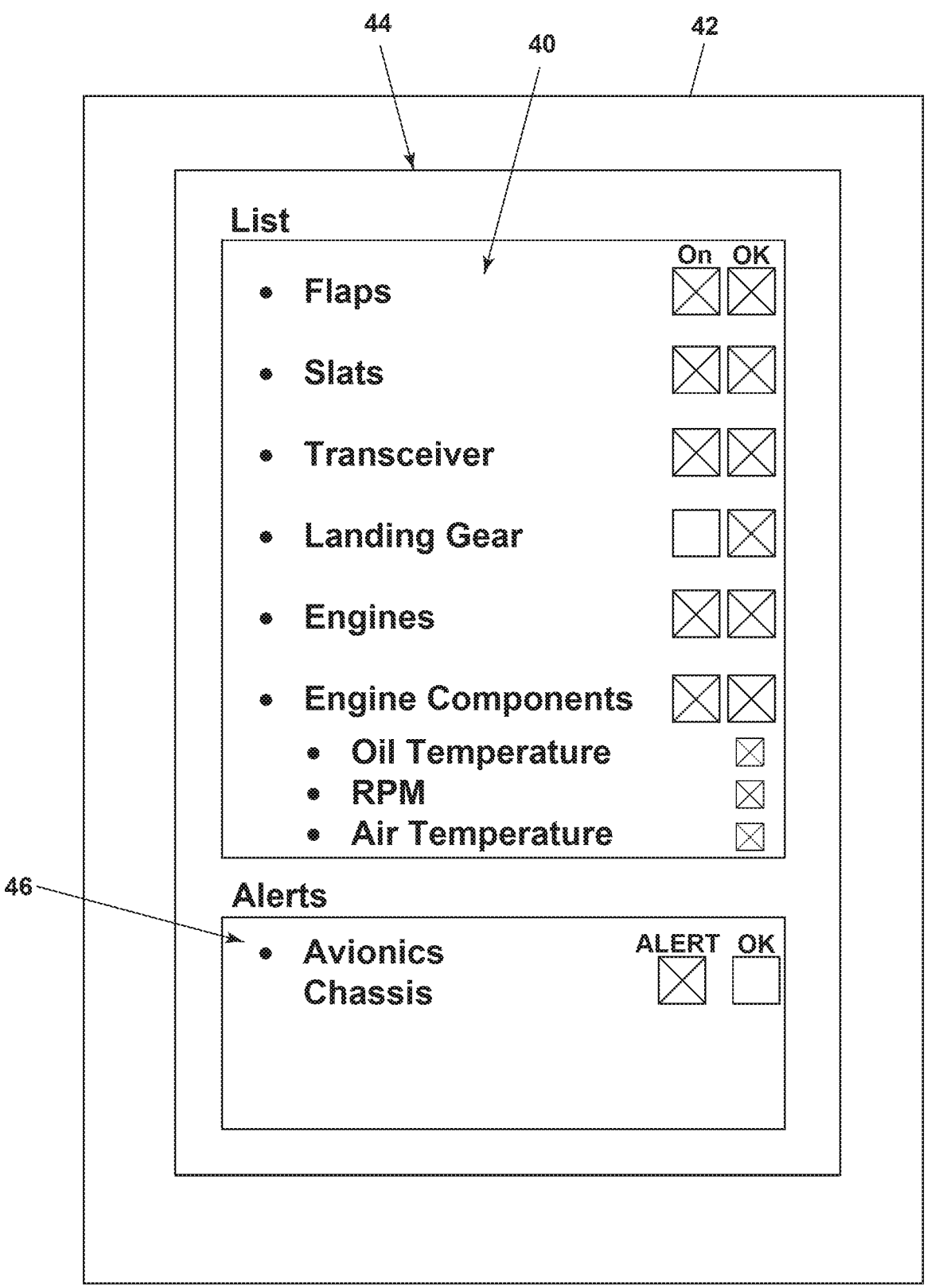
FIG. 2 is a view of an exemplary display showing a non-exhaustive list representative of the aircraft network and components thereon.

Referring now to FIG. 2, regardless of the number, type, or organization of components on the aircraft 10 (FIG. 1), one or more of the components (preferably many) can be compiled into a list 40, which can be provided on a display 42. Such a list 40 can be a virtual list, for example, and can be stored in a controller, a memory, or the avionics chassis 14 and displayed as an executable, software, or program 44 on the display 42. Additionally, the list 40 can be loaded on demand, or re-loaded or populated for each flight, or during flight such as on demand or schedule based. The list 40 can include loaded executables and/or libraries related to the plurality of components, or historical data related thereto. For example, the transceiver 26 can include a set of communication executables, such as a send executable or a receive/parse executable, which can be included in the list 40. Generally, the list 40 can include executables or software-type functionalities related to the plurality of components on the aircraft 10, and the operation thereof, such as an active/non-active condition, a health, or other related operation particular to the component 20.

Similarly, the list 40 can include libraries or configuration files, such as Parameter Data Items containing information related to parameters, measurements, or other information related to operation of the items on the list 40, which can be related to operational routines, external functions, or component functionalities, or variables which can be resolved and ultimately compiled, and reviewed. Such libraries can include information related to the particular aircraft 10, network 12, engine components 20, the operations thereof, as well as historical data related to elements of the library.

Similarly, other relevant static memory items can be incorporated into the list of executables. Non-limiting examples of static memory items can include, items, portions of, or the whole of the executable code, as well as other constants or numerical values. It can also include a list of all known variables which are known to be or should be considered static at given points or times, such as after initialization of a program, or at a specific flight time, such as takeoff or landing. Additionally, it is contemplated that a change to the code can be identified when variables are expected to remain static, but ultimately change. Such a change can be used to identify an issue. Additionally, it is contemplated that static memory can include function pointers.

The list 40 can be a stored file on a memory, which may be accessed on demand by portions of the network 12. Alternatively, the list 40 can be populated on demand. For example, each time the aircraft 10 is operated or inspected, the network 12 can be instructed to populate the list 40. For example, each time the aircraft 10 is started, the list 40 can be automatically populated based upon the particular components provided on the network 12. Furthermore, any stored or saved information from prior population of the list can be kept in a memory (either on the aircraft or remote). Such a prior list or information can be utilized with or compared to the current list 40 to determine if there are any discrepancies or thresholds, which may indicate an issue for the health or security of one or more components, or the network 12 itself. For example, if a prior list build included thirty items, and the current list build includes twenty-nine items, the CMU 30 on the network 12 could make a comparison of the list 40 to the stored information to determine where the discrepancy lies, and potentially how to check or remedy the issue. More specifically, the absence of an item on the list may indicate that the health of that particular item, absent from the list 40, needs attention. Furthermore, such a discrepancy or threshold can be represented in the form of an alert 46 on the display 42, explained in fuller detail below.

During generating of the list 40, operation of the aircraft 10, or on demand, the components on the network 12 can be internally secured, such as with a cryptographic signature or a token which can be shared among the network 12. Such a signature or token can be utilized to securely verify each engine component or even its physical presence on the aircraft 10 or network 12. Furthermore, the use of the token, or with other techniques, such as the signature, the system can be used to prevent a malicious program, executable, or other item from faking or mimicking good health for the system. The token can be something provided by the CMU 30.

After, or during, generation of the list 40, the network configuration can be approved, unapproved, or no longer approved, in non-limiting examples. An approval would result from expected items provided on the list 40. An unapproved list 40 may be one that simply needs approval before continuing, or may be a list 40 that has some unexpected item, discrepancy, threshold, or other error requiring attention. A list 40 that is no longer approved is a list 40 that has been previously approved, but is no longer approved during monitoring of the network 12. An unapproved list 40 can represent that a threshold has been met, where the threshold can include a discrepancy from the list as originally generated, or a discrepancy for a value related to a component on the network, such as a change in throughput, operation, or cryptographic approval. A threshold can be met by any suitable discrepancy between a current list and an original or prior list.

The approval, or lack thereof, can be communicated along or from the network 12, while it is also contemplated that such an approval is provided to the network 12, such as an override or other forced measure. The communication, for example, can be to the pilots via the display 42, such as a visual indication or other warning that maintenance is imminent or required, including the alert 46 as shown. Such a visual indication can be on a display in the cockpit, for example, or on a maintenance display. The maintenance display can be in the cockpit, viewable by the pilots, or may be elsewhere on the airplane where it may be convenient for the maintenance crew. In another example, the maintenance display can be remote from the airplane, and can be viewed by the maintenance crew or personnel remote from the airplane. As such, the display 42 can be remote from the airplane. Additionally, the communication can be in the form of alerting a pilot, operator, air-traffic controller, or other operator, that there may or will be safety impacts, and that action or response may be required. Such a response, or communication, could be dependent on the particular system. Such a response can include disabling particular system(s), such as by pulling circuit breakers, or can include performing an activity, such as releasing masks to the passengers or changing altitude due to depressurization of the cabin. Additional response could include diverting flight, changing flight plan, or even landing as soon as possible. In another example, the communication can be remote, such as sending a wireless signal message to a maintenance system indicating the required maintenance on the network 12 or aircraft 10. In such an example, the display 42 may be remote from the aircraft 10, and in wireless communication with the network 12.

It is further contemplated that no approval may be needed. For example, at start of operation of the aircraft 10, an internal system as part of the network 12 can simply populate the list 40, with no other action at the time. On the other hand, it is contemplated that an approved list 40 be required before aircraft takeoff or landing, or where a manual override may be required.

After initial generation of the list 40, as well as any initial action taken, the CMU 30 can perform monitoring of the network 12, or particular elements or portions thereof. Monitoring can include, generally, measuring or requesting information related to the network 12 and making a determination based upon said measurement or information. The monitoring can be indicative of a health of the device, or a change in the device or its health over time.

More specifically, monitoring can include measuring particular aspects of the network 12, or a particular aspect of an element on the network 12. In one non-limiting example, such a network element can include a switch or an interface, and aspects than can be measured can include throughput or remaining throughput capacity. Additional measured aspects can include, in non-limiting examples, memory usage, memory capacity, processor usage, processor capacity, jitter, latency, vibration, sound, or temperature. Such measured aspects can be compared to a particular threshold. Meeting or exceeding the threshold can be indicative of a poor or degrading health of the element of the network 12, or can be used to schedule maintenance. Similarly, it should be understood that meeting or exceeding a threshold can also be indicative of a breach of network security.

During monitoring of the network 12, or aspects thereof, values, lists, or other information can be continuously, periodically, or on-demand requested or stored, as well as compared to other values or thresholds in order to determine if there are any trends, such as unexpected behavior that may not reach the level of the set threshold. Such trends can be built by comparing periodic measurements to one another, or over time, such as a variance between the most recent measurements and the prior periodic measurement. For example, a component on the network 12 that has a temperature threshold of 500° F., but an operational temperature of 300° F., may be in need of maintenance or inspection if the temperature has been trending upwardly toward the threshold value, but still has not reached it. In doing this, the network 12 can provide for anticipating an issue with the health or security of the network 12, particularly before the issue becomes a problem or a failure occurs.

Further still, it is contemplated that the CMU 30 can update or change rule-based analysis of the network 12 based upon trend information gathered during monitoring or based on historical information stored on the network 12, such as in a memory. Further yet, the CMU 30 can update or change rule-based analysis based upon current information, such as during flight, or not during flight.

For example, a component on the network 12 can have a temperature threshold of 500° F., but an operational temperature of 300° F. However, during flight, the decreased exterior temperatures and the decreased pressure results in a standard operational temperature of the component as 280° F. Thus, in such an instance, it is contemplated that the CMU 30 can change the rule for the standard operating temperature for the network 12. For example, such a change could be that during flight, the threshold temperature is reduced to 480° F., as the standard operational temperature has also dropped twenty degrees during flight conditions. In another example, the change or correction based upon the rule change can be percentage based. More specifically, decreasing the operational temperature of 300° F. to 280° F. provides about a 7% decrease. Thus, the threshold during flight can be decreased to 467° F., also at the same percentage rate of decrease. While this is merely exemplary, it should be understood that utilizing or analyzing historic data and making real-time comparisons or adjustments can provide for updating the particular rules of the CMU 30, in order to monitor the health and security of the network 12 in real time more accurately, as conditions can vary. In another example, the rule need not be changed, but could be included as a new rule. For example, the rule would be something akin to "during flight, the threshold temperature value is 480° F.", which can be utilized alongside with the original rule, without modifying the original rule.

The CMU 30 can be pre-loaded with the aircraft architecture. The aircraft architecture can include information such as how many redundant databuses there are, and what information and from what sources the information is passed over the databus. For example, if a loss of one databus is imminent, data sources that are only available on one bus could be routed over one or more other buses if network capacities or capabilities permit. Another example of architecture can include which aircraft functions are bundled in which equipment. For example, in 'federated systems' each box has one aircraft function, whereas the current trend is to move toward integrated avionics systems, where a box has multiple aircraft functions within it. Knowledge of the failure of a box allows a prediction and warning of which aircraft functions may be diminished or impacted which then permits the system to have dynamic reconfiguration of the aircraft and systems to compensate therefor. Such a dynamic reconfiguration can be done with or without pilot intervention, when in flight or preflight. The aircraft architecture can include information pertaining to the network 12, as well as elements and components thereon. More specifically, information related to the network 12 or the components thereon can include default values, threshold values, number of components, type of components, or any other historical information which may be relevant to a monitoring analysis of the network component. Additionally, utilizing the aircraft architecture can provide for providing early warning, such as to the pilots or maintenance personnel, that some aircraft components or functions may be or have met a threshold, have been impacted by failures, or if a failure is anticipated or imminent. It is further contemplated that an IMA cabinet with multiple processing cards, where each card can be slaved to an individual aircraft function, that the cards may be used as redundancies to account for system impacts or failures. With dynamic reconfiguration of the system as necessary, a lower criticality function could be changed or updated in lieu of a higher criticality component or function. Such a system would require cards with less overall cost, less weight, and improve power savings or efficiency while maintaining or improve overall system safety and protection.

Further still, it is contemplated that network components can be added to the network 12, preconfigured for use in the network 12 and the CMU 30. For example, the network components can be 'plug and play' type, meaning that they will be preloaded with software or other information, stored on a memory, that is designed to communicate with the CMU 30 via the network 12, such that an added component can be added to the list 40 of executables or functionalities automatically by the CMU 30. Alternatively, it is contemplated that the component can be manually added to the CMU 30, or that CMU 30 can be instructed to perform a check and update the list 40 as necessary, to include the detection of a new or replaced component.

The list 40 can be continuously checking, monitoring, or updating, such that the CMU 30 periodically pings the components, such as with an electrical signal, to check for existence of the components on the list 40, lack thereof, more than original, or that one or more of the components has changed, such as a parameter of the component meeting a predetermined threshold, or having some operation discrepancy or inconsistency.

Such continuous monitoring can provide for effectively monitoring the safety and security of important components and features of the network 12 or the aircraft 10. Traditional enterprise security systems do not readily work in an aircraft environment, and require in-depth reworking to be suited for an aircraft system architecture, which is time consuming and expensive. The network 12 as discussed herein provides for monitoring the aircraft and avionics thereof, and is tailored to the avionics environment to secure aircraft networks and systems. Such tailoring can be specific to aircraft operations and components, as well as continued monitoring of said components.

There are trends to have high integration of multiple aircraft through using Integrated Modular Avionics and Interface Devices that bundle sensor data information onto large databases. Such bundling and use of large databases increases the chance of a software fault or common mode failure, which could impact a wide range of aircraft functionalities. Similarly, the network 12 can also consider or monitor hardware aspects of the components, such as hardware faults or component disconnection. However, it should be appreciated that aircraft components should be maximally resilient to the wear out or physical failures of such components, as well as protected from external factors, such as foreign object damage. Thus, while monitoring the safety and security of the network, the CMU 30 can also effectively monitor the hardware systems or faults thereof.

It should be understood that the disclosure provided herein provides for an improved ability to identify or warn for aircraft system security and health issues earlier than with current methods. Such early warnings or alerts can permit the aircraft or the pilots to react accordingly if an issue is identified. Similarly, it can be reconfigured to maximize the use of available resources (such as processing capabilities or memory storage) or to allow for redundant installations to be reduced. Specifically, continuous monitoring of the network 12 with the CMU 30 can provides for continuous updating of the monitoring of the network 12 based upon the list 40. Such continuous monitoring can update the list 40 in real time, which reduces or eliminates the need for system redundancies.

The CMU 30 and network 12 as provided and discussed herein provides for improved system and operational safety and security for the aircraft network 12. Similarly, building the list 40 provides for dynamic reconfiguration of the network 12 and how information is processed and used over the network 12. Additionally, the network 12, CMU 30, and related system provides for cost reduction and saving through decreased redundancies in the network 12 and through less diversions through unnecessary system components or routines. Additionally, an improved dispatch reliability will also provide for cost savings.

To the extent not already described, the different features and structures of the various aspects can be used in combination with each other as desired. That one feature cannot be or is not illustrated or described in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

1. A method of monitoring health and security of networked avionics on an aircraft, the method comprising: generating a list including executables and libraries representative of the networked avionics; monitoring the list; alerting when one or more of the networked avionics provided on the list meets a predetermined threshold.

2. The method of any preceding clause wherein the executables and libraries include configuration files and static memory.

3. The method of any preceding clause wherein the predetermined threshold includes where one or more items on the list are absent from the list.

4. The method of any preceding clause wherein generating the list further includes verifying, cryptographically, that the networked avionics represented on the list are on the aircraft or on a network in communication with the aircraft.

5. The method of any preceding clause wherein the list further includes relevant static memory items stored on at least one of the networked avionics.

6. The method of any preceding clause wherein the list is generated on a configuration management unit, a network switch, or an interface device.

7. The method of any preceding clause wherein the list is generated on the interface device, and the interface device includes a remote interface unit.

8. The method of any preceding clause wherein the configuration management unit includes an aircraft architecture.

9. The method of any preceding clause wherein alerting further includes indicating which functions of the aircraft can be impacted when one or more of the networked avionics meets the predetermined threshold.

10. The method of any preceding clause wherein monitoring the list includes periodically measuring aspects of the networked avionics and comparing the measured aspects to the predetermined threshold.

11. The method of any preceding clause wherein periodically measuring includes continuously measuring aspects of the networked avionics.

12. The method of any preceding clause wherein measuring aspects includes measuring throughput or throughput capacity for one or more of the networked avionics.

13. The method of any preceding clause wherein measuring aspects includes measuring one or more of memory usage, memory capacity, processor usage, processor capacity, temperature, vibration, sound, or pressure.

14. The method of any preceding clause wherein periodically measuring further includes storing historical information based upon prior periodic measurements and comparing the most recent periodic measurement to at least one of the prior periodic measurements to determine a trend.

15. The method of any preceding clause wherein monitoring further includes monitoring the trend to identify unexpected behavior without meeting the predetermined threshold.

16. The method of any preceding clause further comprising updating the predetermined threshold based upon the trend.

17. The method of any preceding clause further comprising reconfiguring the network of networked avionics based upon the trend.

18. A network system for an aircraft comprising: a set of aircraft components; a network communicatively and electronically interconnecting the set of aircraft components; a configuration management unit electronically communicable with the network and configured to detect or measure the set of aircraft components across the network, wherein the configuration management unit is configured to generate a list representing a configuration of the network and the set of aircraft components; wherein the list includes executables or libraries associated with the set of aircraft components and the network; and wherein the configuration management unit is configured to monitor the list to determine if the configuration is no longer approved by the configuration management unit.

19. The network system of any preceding clause wherein the monitoring the list includes one or more of monitoring throughput, monitoring throughput capacity, monitoring memory usage, monitoring memory capacity, monitoring temperature, or monitoring pressure for the set of aircraft components.

20. The network system of any preceding clause wherein the configuration management unit is part of a configuration management unit carrying an architecture for the aircraft.

21. A method of monitoring network security in an aircraft, the method comprising: generating a list representative of an aircraft network and one or more aircraft components on the aircraft network; periodically monitoring the list; and indicating, on a display, which functionalities of the aircraft could be impacted or are impacted when the one or more aircraft components monitored on the list reaches a predetermined threshold.

22. The method of any preceding clause wherein indicating on the display occurs in a cockpit of the aircraft or is displayed on a maintenance display.

23. The method of any preceding clause wherein periodically monitoring the list further includes storing, in a memory, historical information based upon prior periodic measurements and comparing the most recent periodic measurement to at least one of the prior periodic measurements to determine a trend.

24. The method of any preceding clause wherein monitoring further includes monitoring the trend to identify unexpected behavior without meeting the predetermined threshold.

25. The method of any preceding clause further comprising updating the predetermined threshold based upon the trend.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of monitoring health and security of networked avionics for an aircraft, the method comprising:
   generating a list representative of a network configuration of the networked avionics, the list including executables and libraries representative of the networked avionics;
   evaluating at least one of a cryptographic signature or a cryptographic token for each of the networked avionics corresponding to the list;
   verifying, based on the evaluating, that each of the networked avionics is at least one of physically present on the aircraft or located on a network in communication with the aircraft;
   monitoring, by a configuration management unit (CMU), the networked avionics corresponding to the list, wherein monitoring the networked avionics comprises measuring at least one aspect of the networked avionics and repeatedly comparing the at least one aspect to a predetermined threshold to define a most recent measurement and at least one prior measurement;
   comparing the most recent measurement to the at least one prior measurement to determine a trend;
   alerting when one or more of the networked avionics provided on the list satisfies a predetermined threshold;
   updating the predetermined threshold based upon the trend when the predetermined threshold is unmet by the one or more of the networked avionics;
   monitoring the list to determine if the CMU no longer approves the network configuration; and
   dynamically reconfiguring the network configuration when the network configuration is no longer approved by the CMU;
   wherein the dynamically reconfiguring comprises at least one of:

updating a data pathway from where the at least one aspect is received from; or updating the list to include detection of at least one of a new avionics component or a replaced avionics component.

2. The method of claim 1 wherein the executables and libraries include configuration files and static memory.

3. The method of claim 1 wherein the list further includes relevant static memory items stored on at least one of the networked avionics.

4. The method of claim 1 wherein alerting further includes indicating which functions of the aircraft are impacted when one or more of the networked avionics meets the predetermined threshold.

5. The method of claim 1 wherein measuring at least one aspect of the networked avionics includes continuously measuring the at least one aspect of the networked avionics.

6. The method of claim 1 wherein monitoring further includes monitoring the trend to identify unexpected behavior without meeting the predetermined threshold.

7. A network system for an aircraft, comprising:
a set of aircraft components;
a network communicatively and electronically interconnecting the set of aircraft components; and
a configuration management unit (CMU) electronically communicable with the network and configured to detect or measure the set of aircraft components across the network,
wherein the configuration management unit is configured to:
generate a list representing a configuration of the network and the set of aircraft components;
evaluate at least one of a cryptographic signature or a cryptographic token for each aircraft component of the set of aircraft components corresponding to the list;
verify, based on the evaluation, that each aircraft component of the set of aircraft components is at least one of physically present on the aircraft or located on a network in communication with the aircraft;
monitor the set of aircraft components corresponding to the list, wherein monitoring the set of aircraft components comprises measuring at least one aspect of at least one aircraft component of the set of aircraft components to define a measured aspect of the at least one aircraft component, and repeatedly comparing the measured aspect to a predetermined threshold to define a most recent measurement and at least one prior measurement;
compare the most recent measurement to the at least one prior measurement to determine a trend;
update the predetermined threshold based upon the trend when the predetermined threshold is unmet by the at least one aircraft component of the set of aircraft components;
monitor the list to determine if the CMU no longer approves the configuration; and
if the CMU no longer approves the configuration, dynamically reconfigure the configuration of the network by updating a data pathway from where the at least one aspect is measured from;
wherein the list includes executables or libraries associated with the set of aircraft components and the network.

8. The network system of claim 7 wherein the monitoring the list includes one or more of monitoring throughput, monitoring throughput capacity, monitoring memory usage, monitoring memory capacity, monitoring temperature, or monitoring pressure for the set of aircraft components.

9. A method of monitoring network security for an aircraft, the method comprising:
generating a list representative of an aircraft network and one or more aircraft components on the aircraft network;
evaluating at least one of a cryptographic signature or a cryptographic token for each of the one or more aircraft components corresponding to the list;
verifying, based on the evaluating, that each of the one or more aircraft components is at least one of physically present on the aircraft or located on a network in communication with the aircraft;
periodically monitoring the one or more aircraft components corresponding to the list;
measuring at least one aspect of the one or more aircraft components and repeatedly comparing the at least one aspect to a predetermined threshold to define a most recent measurement and at least one prior measurement, the at least one aspect comprising at least one of the cryptographic signature, the cryptographic token, a memory usage, a memory capacity, a processor usage, a processor capacity, a jitter, or a latency;
comparing the most recent measurement to the at least one prior measurement to determine a trend;
indicating, on a display, an impacted aircraft function when the at least one aspect reaches a predetermined threshold; and
updating the predetermined threshold based upon the trend when the predetermined threshold is unmet by the at least one aspect.

10. The method of claim 9 wherein periodically monitoring the list further includes storing, in a memory, historical information based upon prior periodic measurements.

11. The method of claim 9 wherein the periodically monitoring further includes monitoring the trend to identify unexpected behavior without meeting the predetermined threshold.

12. The network system of claim 7, wherein the executables and libraries include configuration files and static memory.

13. The method of claim 1, wherein the CMU comprises an interface device with a remote interface unit, and wherein the list is generated on the interface device.

14. The method of claim 1, further comprising comparing the list with a stored list build.

15. The method of claim 14, further comprising determining an absence of an item from the list that is present in the stored list build, wherein the predetermined threshold comprises the absence.

16. The network system of claim 7, further comprising an avionics chassis with a processor and having the CMU.

17. The network system of claim 7, wherein the CMU comprises an aircraft architecture.

18. The network system of claim 7, wherein the CMU is further configured to compare the list with a stored list build, and to determine an absence of an item from the list that is present in the stored list build, wherein the predetermined threshold comprises the absence.

19. The network system of claim 7, wherein the at least one aspect comprises at least one of the cryptographic signature, the cryptographic token, a memory usage, a memory capacity, a processor usage, a processor capacity, a jitter, or a latency.

* * * * *